(12) United States Patent
Yoshida et al.

(10) Patent No.: US 6,338,920 B1
(45) Date of Patent: Jan. 15, 2002

(54) ELECTRODE FOR LITHIUM ION SECONDARY BATTERY AND LITHIUM ION SECONDARY BATTERY USING THE SAME

(75) Inventors: Yasuhiro Yoshida; Hisashi Shiota; Shigeru Aihara; Kouji Hamano; Michio Murai; Takayuki Inuzuka; Syo Shiraga, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/018,017

(22) Filed: Feb. 3, 1998

(30) Foreign Application Priority Data

| Feb. 4, 1997 | (JP) | ............................................. 9-021700 |
| Nov. 10, 1997 | (JP) | ............................................. 9-307075 |

(51) Int. Cl.$^7$ ............................................... H01M 6/18
(52) U.S. Cl. ...................... 429/304; 429/128; 429/232; 429/235; 429/231.8; 429/231.95
(58) Field of Search .......................... 429/231.95, 231.8, 429/232, 304, 128, 235

(56) References Cited

U.S. PATENT DOCUMENTS

| 3,565,694 A | * | 2/1971 | Chireau ....................... 429/210 |
| 3,819,413 A | * | 6/1974 | Nippe et al. ................. 429/217 |
| 4,092,464 A | * | 5/1978 | Dey et al. .................... 429/127 |
| 4,614,696 A | * | 9/1986 | Ito et al. ...................... 429/222 |
| 4,833,048 A | * | 5/1989 | Dejonghe et al. ............ 429/104 |
| 5,225,296 A | * | 7/1993 | Ohsawa et al. ........... 429/218.1 |
| 5,437,692 A |   | 8/1995 | Dasgupta et al. ........... 29/623.1 |
| 5,456,000 A |   | 10/1995 | Gozdz et al. ............... 29/623.2 |
| 5,460,974 A |   | 10/1995 | Kozak et al. .................. 436/71 |
| 5,498,489 A |   | 3/1996 | Dasgupta et al. ............ 424/152 |
| 5,667,910 A | * | 9/1997 | Takeuchi et al. ............. 429/128 |
| 5,766,789 A | * | 6/1998 | James et al. ................... 429/44 |

FOREIGN PATENT DOCUMENTS

| EP | 0 729 194 |   | 8/1996 |
| EP | 0 746 048 |   | 12/1996 |
| JP | 1-283764 | * | 11/1989 |
| JP | 6-196170 | * | 7/1994 |

OTHER PUBLICATIONS

Patent Abstracts of Japan, vol. 017, No. 097 (E–1326), Feb. 25, 1993, JP 04 289658, Oct. 14, 1992.
Patent Abstracts of Japan, vol. 095, No. 011, Dec. 26, 1995, JP 07 211320, Aug. 11, 1995.
Patent Abstracts of Japan, vol. 008, No. 053 (E–231), Mar. 9, 1984, JP 58 206058, Dec. 1, 1983.
Patent Abstracts of Japan, vol. 097, No. 005, May 30, 1997, JP 09 027315, Jan. 28, 1997.
Patent Abstracts of Japan, vol. 010, No. 213 (E–422), Jul. 25, 1986, JP 61 051749, Mar. 14, 1986.

* cited by examiner

Primary Examiner—Laura Weiner
(74) Attorney, Agent, or Firm—Oblon, Spivak, McClelland, Maier & Neustadt, P.C.

(57) ABSTRACT

A uniform mixture of a powdered active material 1, conductive fiber 2, and a binder resin is applied to a polytetrafluoroethylene plate, etc. to a prescribed thickness and dried to form a sheet electrode 8. A pair of electrodes 8 are adhered to a separator 9 to make an electrode laminate 10. A battery is formed of the electrode laminate 10 or a plurality of the electrode laminates 10.

34 Claims, 4 Drawing Sheets

ELECTRODE FOR LITHIUM ION SECONDARY BATTERY AND LITHIUM ION SECONDARY BATTERY USING THE SAME

BACKGROUND OF THE INVENTION

1. Field of the Invention

This invention relates to an electrode for a lithium ion secondary battery and a lithium ion secondary battery using the same. More particularly, it relates to an electrode structure which can provide such a lithium ion secondary battery that can take an arbitrary shape, for example a thin shape, and has a large energy storage density.

2. Description of the Related Art

There has been a great demand for reduction in size and weight of portable electronic equipment, and its realization relies heavily on improvement of the battery used therein in performance. To meet the demand, development and improvement of a variety of batteries have been proceeding. Characteristics required of batteries include a high voltage, a large energy density, and safety. Lithium ion batteries are secondary batteries that are the most expected of so far developed batteries to achieve a high voltage and a large energy density and will undergo further improvements.

The main part of a lithium ion secondary battery comprises a positive electrode, a negative electrode, and an ionically conducting layer interposed between the electrodes. The lithium ion secondary batteries that have been put to practical use generally employ a positive electrode plate prepared by applying a mixture of a powdered active material, such as a lithium-cobalt oxide, electrically conductive powder, and a binder resin to an aluminum current collector, a negative electrode plate prepared by applying a mixture of a powdered carbonaceous active material and a binder resin to a copper current collector, and an ionically conducting layer made of a porous film of polyethylene, polypropylene, etc. as a separator filled with a lithium ion-containing nonaqueous electrolytic solution.

The improvements on lithium ion secondary batteries in energy density and charge and discharge efficiency greatly rely on the packing density of an active material in each electrode and the utilization of the active material. FIG. 8 schematically illustrates the cross section of an electrode 8 used in a conventional lithium ion secondary battery, which is disclosed, e.g., in JP-A-63-121263 (the term "JP-A" as used herein means an "unexamined published Japanese patent application"). In FIG. 8 reference numeral 1 indicates a powdered active material; 6 an electrically conductive powder; and 7 a current collector. The current collector 7 used in the state-of-the-art electrode, on which an active material is to be applied, is a planar structure, such as foil and net. If the powdered active material 1 alone is applied to the current collector 7, since the amount of the active material in direct contact with the current collector 7 is limited, the current collecting efficiency is not much. Therefore, electrically conductive powder 6, for example, carbon powder should be mixed with the active material powder as stated above.

As described above, a conventional lithium ion secondary battery uses a sheet electrode formed by coating a current collector with a powdered active material mixed with electrically conductive powder for securing sufficient current collecting efficiency. The problem is that the use of the conductive powder reduces the packing density of the active material in the electrode.

Where the battery has a thin shape, it is very likely that the battery is deformed repeatedly by the outer force. In the above-described conventional battery structure, the active material layer tends to be separated from the current collector or broken by the repetition of deformation. Hence, it has been difficult for a thin type battery to maintain durability and safety.

SUMMARY OF THE INVENTION

The present invention has been made for the purpose of solving these problems. An object of the present invention is to provide a lithium ion secondary battery which is highly durable, hardly broken, and safe, can take an arbitrary shape, such as a thin shape, and has a large energy density and excellent charge and discharge characteristics.

Another object of the present invention is; to provide an electrode for providing the above-described battery.

The present invention provides an electrode for a lithium ion secondary battery, which is a sheet formed of a mixture comprising a powdered active material and electrically conductive fiber.

A first aspect of the electrode is an electrode of the present invention, which comprises a fiber-containing active material layer of sheet form formed of a mixture comprising a powdered active material and electrically conductive fiber.

A second aspect of the electrode is an electrode of the first aspect, further comprising an active material layer comprising the powdered active material formed thereon.

A third aspect of the electrode is an electrode of the first aspect, wherein the fiber-containing active material layer is formed on an electrically conductive film.

A fourth aspect of the lithium ion secondary battery is a battery of the present invention, wherein at least one of said positive electrode and negative electrode comprises a fiber-containing active material layer of sheet form formed of a mixture comprising a powdered active material and electrically conductive fiber.

A fifth aspect of the lithium ion secondary battery is a battery of the fourth aspect, wherein the electrolyte is a solid electrolyte.

A sixth aspect of the lithium ion secondary battery is a battery of the fourth aspect, wherein the electrolyte is a separator retaining an electrolytic solution.

A seventh aspect of the lithium ion secondary battery is a battery of the present invention, comprising plurality of electrode laminates each of which is composed of a positive electrode, a negative electrode and electrolyte interposed therebetween, wherein at least one of said positive electrode and negative electrode comprises a fiber-containing active material layer of sheet form formed of a mixture comprising a powdered active material and electrically conductive fiber A eighth aspect of the lithium ion secondary battery is a battery of the seventh aspect, wherein said plurality of electrode laminates are fabricated of a plurality of cut sheets of the electrolyte between which positive electrodes and negative electrodes are alternately interposed.

A ninth aspect of the lithium ion secondary battery is a battery of the seventh aspect, wherein said plurality of electrode laminates are made up of a pair of wound electrolytes between which the positive electrodes and the negative electrodes are alternately interposed.

A tenth aspect of the lithium ion secondary battery is a battery of the seventh aspect, wherein said plurality of electrode laminates are made up of a pair of folded electrolytes between which the positive electrode and the negative electrode are alternately interposed.

DESCRIPTION OF THE PREFERRED EMBODIMENT

The practice of the present invention will be described by referring to the accompanying drawings.

Figure 1:
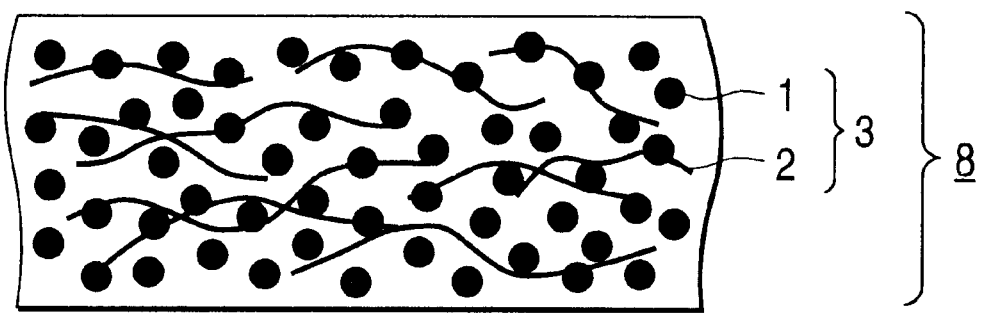
FIG. 1 is a schematic cross section of the electrode according to the present invention.

FIG. 1 is a schematic cross section showing the basic structure of the electrode for a lithium ion secondary battery according to the present invention. The electrode 8 is made up of a fiber-containing active material layer comprising a powdered active material 1 and electrically conductive fiber (hereinafter simply referred to as conductive fiber) 2. The electrode 8 is obtained by, for example, uniformly mixing a powdered active material 1, conductive fiber 2, and a binder resin, applying the mixture on a substrate, such as a polytetrafluoroethylene sheet to a prescribed thickness, followed by drying to obtain sheeting.

The electrode having the structure of FIG. 1 has electrical conductivity and flexibility and can be handled as sheeting (sheet or plate) without a substrate as a supporting member. Since the conductive fiber dispersed in the electrode acts as a current collector, a conventionally employed current collector, such as metal foil or metal net, is not necessary. Thus the electrode achieves reduction in weight while retaining satisfactory current collecting efficiency. Containing no conductive powder, the electrode has an increased packing density of the active material. Compared with a conventional electrode comprising a current collector having formed thereon an active material layer, the electrode of the present invention is markedly rich in softness, exhibiting improved durability against deformation and resistance to break. An electrolytic solution can easily be infiltrated into the electrode to sufficiently fill every voids in the electrode. Because of the absence of a current collector, the amount of the active material to be packed can be increased over a conventional electrode of the same weight, thereby improving performance.

Figure 2:
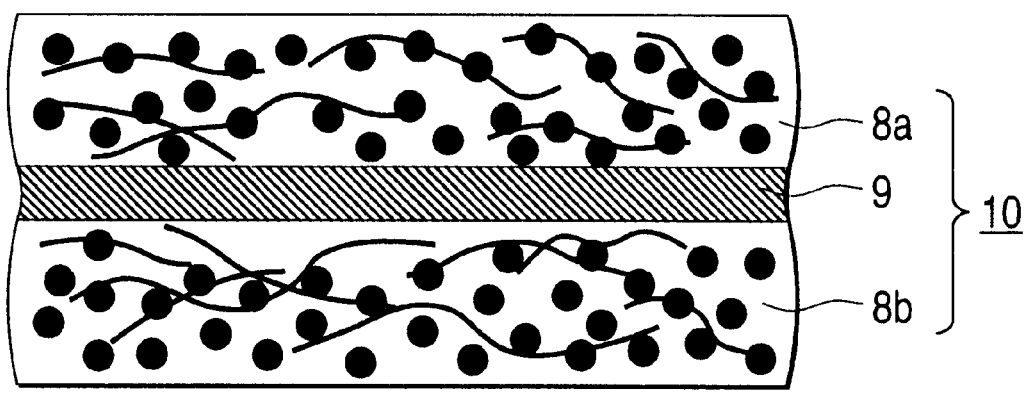
FIG. 2 is a schematic cross section of an embodiment of the electrode according to the present invention.

FIG. 2 is a schematic cross section of a basic structure of the lithium ion secondary battery according to the present invention. The battery of FIG. 2 has a single electrode laminate 10 comprising a positive electrode 8a and a negative electrode 8b bonded through a separator 9 therebetween. When the electrode of the present invention is applied to this battery structure, an increased energy density at charge and an improved charge and discharge efficiency can be obtained. The electrode laminate 10 can take any arbitrary shape such as a thin shape and exhibits improved resistance against deformation, realizing improvements in durability, reliability, and safety.

Figure 3:
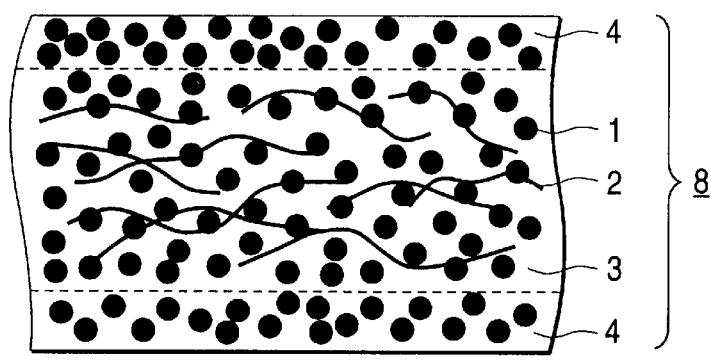
FIG. 3 is a schematic gross section of another embodiment of the electrode according to the present invention.

FIG. 3 is a schematic cross section of an embodiment of the electrode according to the present invention. The electrode 8 comprises a fiber-containing active material layer 3 formed of a uniform mixture comprising a powdered active material 1 and conductive fiber 2 and a thin active material layer 4 made of a powdered active material 1.

The electrode of FIG. 3 and a lithium ion secondary battery having the structure of FIG. 2 in which the electrodes of FIG. 3 are used have the same effects as described above. In addition, the active material layer 4 prevents the conductive fiber 2 from projecting over the surface of the electrode so as not to scratch the separator when assembled into a battery. As a result, safety can be improved.

The thickness of the active material layer 4 does not need to exceed such that can prevent the conductive fiber 2 from projecting over the surface. It is desirable for the active material layer not to have a large thickness. Too large a thickness rather reduces the current collecting efficiency, tending to impair the above effects.

Figure 4:
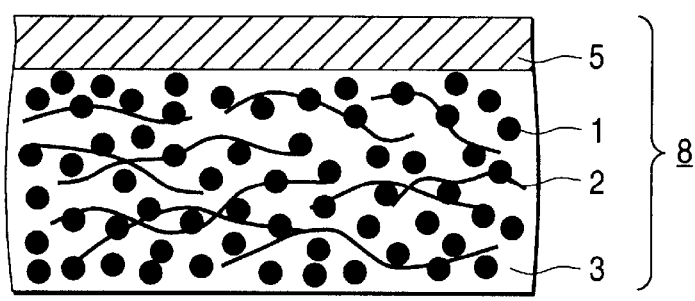
FIG. 4 is a schematic cross section of still another embodiment of the electrode according to the present invention.

FIG. 4 is a schematic cross section of another embodiment of the electrode according to the present invention. The electrode 8 comprises an electrically conductive film (hereinafter simply referred to as conductive film) 5 having formed thereon a fiber-containing active material layer 3 made of a uniform mixture comprising a powdered active material 1 and conductive fiber 2.

According to this embodiment, too, a high performance electrode can be obtained because the packing density of the active material is increased owing to the absence of conductive powder. Compared with a conventional electrode comprising a current collector having formed thereon an active material layer, the electrode of this embodiment has higher performance in softness and durability and flexibility against deformation. The electrode can provide a lithium ion secondary battery having high reliability and safety, a large energy density, and improved charge and discharge efficiency.

The active material which can be used in the positive electrode include complex oxides of lithium and a transition metal, such as cobalt, nickel or manganese; chalcogen compounds containing lithium or complex compounds thereof; and these complex oxides, Li-containing chalcogen compounds or complex compounds thereof that contain various dopant elements. While any substance capable of intercalating and disintercalating lithium ions, which take the main part of the battery performance, can be used as a negative electrode active material, preferred active materials for use in the negative electrode include carbonaceous compounds, such as graphitizing carbon, non-graphitizing carbon, polyacene, and polyacetylene; and aromatic hydrocarbon compounds having an acene structure, such as pyrene and perylene.

The active materials are used in a powdered or particulate state. Particles having a particle size of 0.3 to 20 $\mu$m can be used. A preferred particle size is 1 to 5 $\mu$m. If the particle size is too small, the surface area of the active material particles coated with the binder resin becomes too much to perform lithium ion intercalation and disintercalation efficiently at charge and discharge, resulting in reduction of battery characteristics. If the particle size is too large, it is not easy to form the active material mixture into a thin film, and the packing density is reduced.

The conductive fiber which can be used in the present invention is not particularly limited as long as it has electron conductivity and undergoes no reaction in an electrode. Useful conductive fiber includes metal fiber, such as aluminum fiber, copper fiber, and stainless steel fiber, and carbon fiber. It is preferable for the individual fibers to have a diameter of 5 to 200 $\mu$m, particularly 5 to 100 $\mu$m, and a length of 1 to 100 mm, particularly 7 to 30 mm. It is difficult to give sufficient strength to the electrode with finer fibers. Thicker fibers not only make it infeasible to form a thin electrode but have reduced current collecting efficiency. Too long or too short fibers make it difficult to form the active material mixture into sheeting. Where a fiber-containing active material layer is to be formed on a conductive film, fibers having shorter lengths can also be used.

Any metal stable within a battery can be used as a conductive film. Aluminum is preferred for a positive electrode, and copper is preferred for a negative electrode. The conductive film can be foil, net, expanded metal, etc. Those presenting a large void area, such as net and expanded metal, are preferred from the standpoint of ease of impregnation with an electrolytic solution after adhesion.

The ionically conducting layer which is put in between electrodes in assembling a lithium ion secondary battery is not particularly limited and includes a separator impregnated with an electrolytic solution, a gel electrolyte, and a solid electrolyte. The electrolytic solution can be prepared from a nonaqueous solvent and a lithium-containing electrolyte salts that have been employed in conventional batteries. Examples of useful solvents include ethers, such as dimethoxyethane, diethoxyethane, diethyl ether, and dimethyl ether; esters, such as ethylene carbonate, propylene carbonate, diethyl carbonate, and dimethyl carbonate; and mixed solvents consisting of two members selected from the ether solvents or the ester solvents or mixed solvents consisting of one member selected from the former group and one member selected from the latter group. Examples of useful electrolyte salts are $LiPF_6$, $LiAsF_6$, $LiClO_4$, $LiBF_4$, $LiCF_3SO_3$, $LiN(CF_3SO_2)_2$, and $LiC(CF_3SO_2)_3$.

Figure 5:
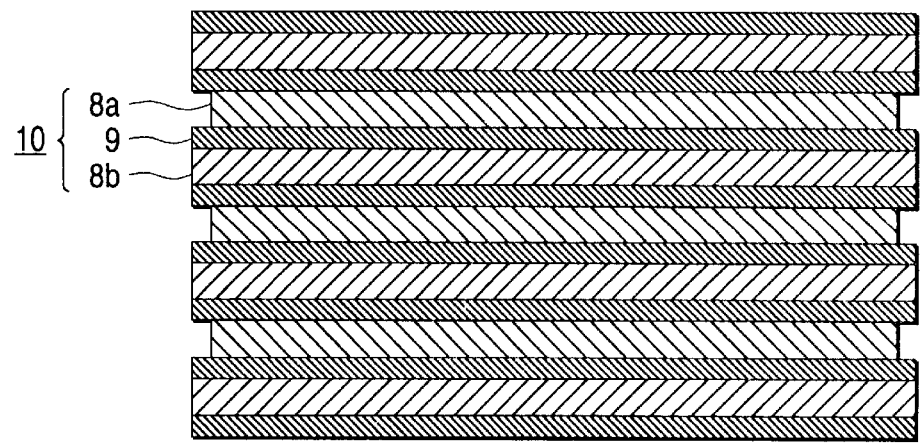
FIG. 5 is a schematic cross section of the main part of a lithium ion secondary battery according to one embodiment of the present invention.
Figure 6:
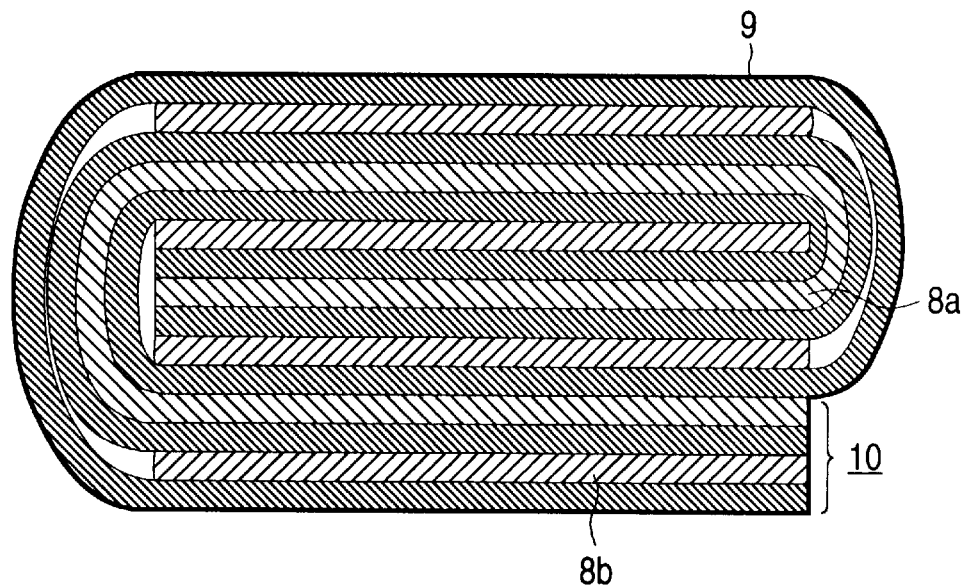
FIG. 6 is a schematic cross section of the main part of a battery according to another embodiment of the present invention.
Figure 7:
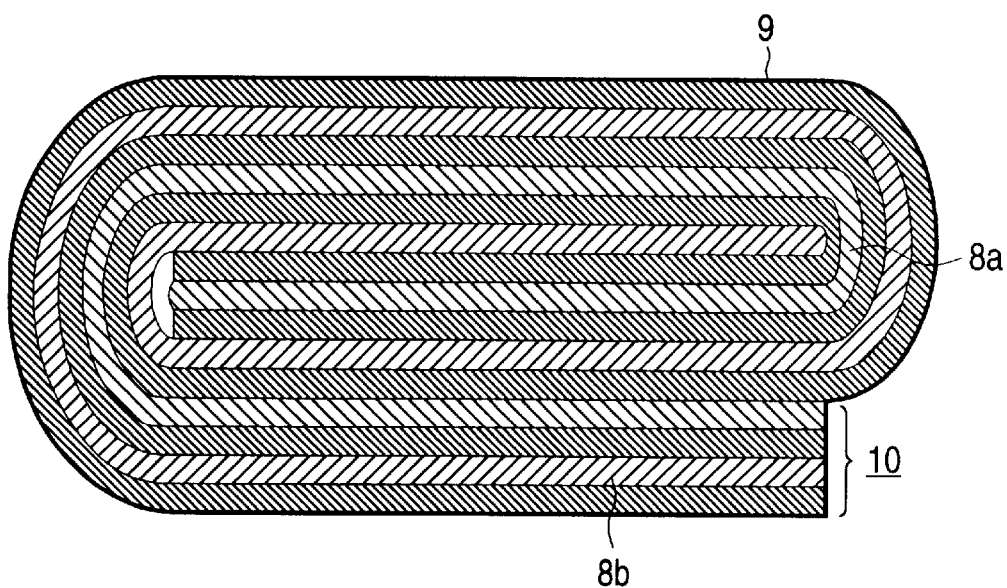
FIG. 7 is a schematic cross section of the main part of a battery according to still another embodiment of the present invention.
Figure 8:
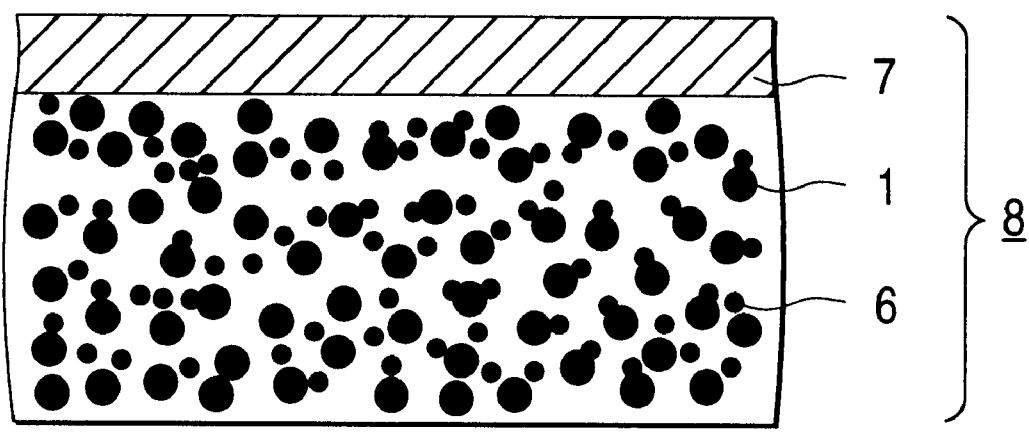
FIG. 8 is a schematic cross section of a conventional electrode for a lithium ion secondary battery.

The structure of the lithium ion secondary battery according to the present invention includes a single electrode laminate structure shown in FIG. 2, which is composed of a pair of electrodes stuck to a separator and multilayer structures, such as a tabular multi-laminate structure shown in FIG. 5 which is composed of a plurality of electrode laminates and tabular roll type structures shown in FIGS. 6 and 7 in which an electrode laminate is rolled up into an oblong ellipsoid. The lithium ion secondary battery of the present invention is characterized by an increased energy density at charge, improved charge and discharge efficiency, freedom of shape (any arbitrary shape, such as a thin shape, can be taken), and improved resistance to deformation which leads to improved durability, reliability and safety. Therefore, when in particular the electrode of the present invention is applied to the multilayer structures, there are provided compact and high performance batteries having a large battery capacity and excellent durability and reliability.

The present invention will now be illustrated in greater detail with reference to Examples, but it should be understood that the invention is not construed as being limited thereto. Unless otherwise noted, all the percents are given by weight.

Embodiment 1

Seventy percents of $LiCoO_2$, 25% of aluminum fiber having a diameter of 30 $\mu$m and a length of 2 to 20 mm, and 5% of polyvinylidene fluoride (hereinafter abbreviated as PVDF) were dispersed in a solvent, such as N-methylpyrrolidone, to prepare a positive electrode active material paste. The paste was applied to a polytetrafluoroethylene (hereinafter abbreviated as PTFE) plate with a doctor blade to a thickness of about 300 $\mu$m and dried to prepare a positive electrode.

Embodiment 2

Seventy-five percents of Mesophase Microbead Carbon (a trade name, produced by Osaka Gas Co., Ltd.), 20% of carbon fiber having a diameter of 13 $\mu$m and a length of 10 mm ("DONACAREBO S CHOP" produced by Donac K. K.) and 5% of PVDF were dispersed in a solvent to prepare a negative electrode active material paste. The paste was applied to a PTFE plate with a doctor blade to a thickness of about 300 $\mu$m and dried to prepare a negative electrode.

Embodiment 3

Seventy-five percents of Mesophase Microbead Carbon (a trade name, produced by Osaka Gas Co., Ltd.), 20% of copper fiber having a diameter of 30 $\mu$m and a length of 2 to 20 mm, and 5% of PVDF were dispersed in a solvent to prepare a negative electrode active material paste. The paste was applied to a PTFE plate with a doctor blade to a thickness of about 300 $\mu$m and dried to prepare a negative electrode.

Embodiment 4

Seventy-five percents of $LiCoO_2$, 15% of stainless steel fiber having a diameter of 8 $\mu$m and a length of 30 mm ("Nasron" produced by Nippon Seisen Co., Ltd.), and 5% of PVDF were dispersed in a solvent to prepare a positive electrode active material paste. The paste was applied to a PTFE plate with a doctor blade to a thickness of about 300 $\mu$m and dried to prepare a positive electrode.

All the electrodes prepared in Embodiments 1 to 4 had electrical conductivity and flexibility and could be handled as a film without a substrate. Because the active material powder and the conductive fiber were uniformly mixed, the electrodes had a satisfactory current collecting efficiency. They weighed less than conventional ones because of the absence of a current collector, such as metal foil or metal net. They had an increased packing density of the active material owing to the absence of conductive powder. They had flexibility and softness, had improved durability against deformation, and were hardly broken.

The electrodes of the present invention can be applicable by coating directly on both surface of the separator, respectively. According to the case, an adhesive layer is not required and it is easy to mount.

Preferably stainless steel fiber has a diameter smaller than 50 $\mu$m. More preferably stainless steel fiber has a diameter smaller than 30 $\mu$m.

The drying step can be conducted by heating to 100–150° C. for 20 minutes. Preferably the drying step can be conducted by heating to 120–150°C. The drying step can be conducted by heating under pressure at the temperature more than 120° C. by hot press method.

Embodiment 5

$LiCoO_2$ and aluminum fiber having a diameter of 30 $\mu$m and a length of 2 to 20 mm were mixed at a weight ratio of 7:3, and the mixture was stirred in a 3% solution of PVDF in N-methylpyrrolidone as a solvent and made to sediment uniformly on a PTFE membrane filter. After the solvent was removed, a PTFE plate was pressed onto the cast film, and the film was dried to form an electrode having a thickness of about 180 $\mu$m. The resulting electrode exhibited excellent characteristics similarly to the foregoing Embodiments.

Embodiment 6

Seventy percents of LiCoO$_2$, 25% of aluminum fiber having a diameter of 30 μm and a length of 2 to 20 mm, and 5% of PVDF were dispersed in a solvent to prepare a positive electrode active material paste. The paste was applied to a PTFE plate with a doctor blade to a thickness of about 300 μm and dried to form a fiber-containing active material layer. A positive electrode active material paste prepared from 90% of LiCoO$_2$ and 10% of PVDF was applied on the fiber-containing active material layer with a bar coater and dried to form an active material layer. There was obtained an electrode composed of a fiber-containing active material layer and a fiber-free active material layer. The resulting electrode exhibited excellent characteristics similarly to the foregoing Embodiments. Additionally, safety was improved because the conductive fiber was not exposed on the surface.

Embodiment 7

Seventy percents of LiCoO$_2$, 25% of aluminum fiber having a diameter of 30 μm and a length of 2 to 20 mm, and 5% of PVDF were dispersed in a solvent to prepare a positive electrode active material paste. The paste was applied to a 20 μm thick aluminum foil as a conductive film with a doctor blade to a thickness of about 200 μm and dried to form a positive electrode composed of a conductive film having formed thereon a fiber-containing active material layer. Since the active material powder and the conductive fiber were uniformly mixed, the electrode exhibited satisfactory current collecting efficiency. Containing no conductive powder, the electrode had a large packing density of the active material thereby exhibiting excellent characteristics. Further, the electrode had flexibility, securing improved durability against deformation.

Embodiment 8

A separator (Cellguard #2400, produced by Hoechst Celanese Plastics Ltd.) was sandwiched in between the positive electrode obtained in Embodiment 1 and the negative electrode obtained in Embodiment 2. The electrode laminate was impregnated with an electrolytic solution of lithium hexafluorophosphate (electrolyte) in a mixed solvent of ethylene carbonate and 1,2-dimethoxyethane. The impregnated electrode laminate was put in an aluminum laminate film pack, and the film pack was heat-sealed while evacuating so as to prevent air from being entrapped between the electrodes to complete a battery having a single electrode laminate. The electrolytic solution was smoothly infiltrated into the electrode to sufficiently and easily fill the voids in the electrode.

On evaluating the battery characteristics, the energy density per unit weight was 90 Wh/kg. Even after 200 charge and discharge cycles at a current of C/2, the charge capacity was as high as 75% of the initial level. There was obtained a lithium ion secondary battery having a large energy density and excellent charge and discharge characteristics. Compared with conventional batteries of the same structure but using a current collector such as metal net, the resulting battery was rich in softness, hardly underwent deterioration in battery characteristics due to deformation by outer force, and had high reliability and safety.

Embodiment 9

A separator (Cellguard #2400, produced by Hoechst Celanese Plastics Ltd.) was sandwiched in between the positive electrode obtained in Embodiment 6 and the negative electrode obtained in Embodiment 2. The electrode laminate was impregnated with an electrolytic solution of lithium hexafluorophosphate (electrolyte) in a mixed solvent of ethylene carbonate and 1,2-dimethoxyethane and put in an aluminum laminate film pack. The film pack was heat-sealed while evacuating so as to prevent air from being entrapped between the electrodes to complete a battery having a single electrode laminate. The electrolytic solution was smoothly infiltrated into the electrode similarly to Embodiment 8.

On evaluating the battery characteristics, the energy density per unit weight was 93 Wh/kg. Even after 150 charge and discharge cycles at a current of C/2, the charge capacity was as high as 78% of the initial level. There was obtained a lithium ion secondary battery having a large energy density and excellent charge and discharge characteristics. Similarly to Embodiment 8, the resulting battery was rich in softness, hardly underwent deterioration in battery characteristics due to deformation by outer force, and had high reliability and safety.

Embodiment 10

A separator (Cellguard #2400, produced by Hoechst Celanese Plastics Ltd.) was sandwiched in between the positive electrode obtained in Embodiment 7 and the negative electrode obtained in Embodiment 2. The electrode laminate was impregnated with an electrolytic solution of lithium hexafluorophosphate (electrolyte) in a mixed solvent of ethylene carbonate and 1,2-dimethoxyethane and put in an aluminum laminate film pack. The film pack was heat-sealed while evacuating so as to prevent air from being entrapped between the electrodes to complete a battery having a single electrode laminate.

On evaluating the battery characteristics, the energy density per unit weight was 80 Wh/kg. Even after 150 charge and discharge cycles at a current of C/2, the charge capacity was as high as 75% of the initial level. There was obtained a lithium ion secondary battery having a large energy density and excellent charge and discharge characteristics.

Embodiment 11

A separator (Cellguard #2400, produced by Hoechst Celanese Plastics Ltd.), the positive electrode prepared in Embodiment 1, and the negative electrode prepared in Embodiment 2, each of which had been cut in prescribed sizes, were repeatedly superposed in this order to form a tabular laminate battery body having the structure shown in FIG. 5. Current collecting tabs connected to the every end of the positive electrodes and the negative electrodes were connected by spot welding to make electrical connections in series. The battery body was impregnated with an electrolytic solution of lithium hexafluorophosphate (electrolyte) in a mixed solvent of ethylene carbonate and 1,2-dimethoxyethane and put in an aluminum laminate film pack. The film pack was heat-sealed while evacuating so as to prevent air from being entrapped between the electrodes to complete a battery having a multilayer structure. Similarly to the single laminate battery obtained in the foregoing Embodiments, there was obtained a lithium ion secondary battery having a large energy density, excellent charge and discharge characteristics, and high durability, reliability and safety. Especially according to use the electrodes of the present invention, it has an advantage that impregnation with an electrolytic solution into the laminate is easy. The battery had an increased battery capacity, yet it was compact.

Embodiment 12

A positive electrode having a band form was prepared in the same manner as in Embodiment 2. The positive electrode was sandwiched in between a pair of separators (Cellguard #2400, produced by Hoechst Celanese Plastics Ltd.), and one end of the resulting laminate was folded back at a prescribed length, and a piece of a negative electrode which was prepared in the same manner as in Embodiment 1 and cut in a prescribed length was inserted into the fold, and the laminate was passed through a laminator. Subsequently, and another piece of the negative electrode cut in a prescribed length was placed on the separator at the position facing the negative electrode inserted into the fold. The separator/positive electrode/separator laminate was given a half turn while enveloping the negative electrode in to make an oblong ellipsoid. Another half turn was given to the laminate with a still another cut piece of the negative electrode inserted therein. These steps were repeated to roll up the laminate into a tabular roll type battery body having a plurality of electrode laminates as shown in FIG. 6. Current collecting tabs connected to the every end of the positive electrodes and the negative electrodes were connected by spot welding to make electrical connections in series. The battery body was impregnated with an electrolytic solution of lithium hexafluorophosphate (electrolyte) in a mixed solvent of ethylene carbonate and 1,2-dimethoxyethane and put in an aluminum laminate film pack. The film pack was heat-sealed while evacuating so as to prevent air from being entrapped between the electrodes to complete a battery having a multilayer structure. Similarly to the battery of Embodiment 11, there was obtained a compact lithium ion secondary battery having a large energy density, excellent charge and discharge characteristics, a large battery capacity, and high durability, reliability and safety.

While in this embodiment a separator/positive electrode/separator laminate was rolled up while inserting a cut piece of the negative electrode for every half turn, the multilayer battery can also be prepared by rolling up a separator/negative electrode/separator laminate while inserting a cut piece of the positive electrode for every half turn.

Further, instead of rolling, the separator/electrode/separator laminate may be folded successively while inserting a cut piece of the counter electrode for every fold.

Embodiment 13

A positive electrode of band form prepared in the same manner as in Embodiment 2 was arranged between a pair of separators (Cellguard #2400, produced by Hoechst Celanese Plastics Ltd.). A negative electrode of band form prepared in the same manner as in Embodiment 1 was arranged on one of the separators with a prescribed length of its starting end sticking out over the end of the separator. The sticking end of the negative electrode was first passed through a laminator, and the negative electrode, the separator, the positive electrode, and the separator were then passed through the laminator to prepare a laminate of band form. The sticking end of the negative electrode was folded back, and the laminate was rolled up in such a manner that the folded negative electrode might be wrapped in to make an oblong ellipsoid to form a tabular roll type battery body comprising a plurality of electrode laminates as shown in FIG. 7. The battery body was impregnated with an electrolytic solution of lithium hexafluorophosphate (electrolyte) in a mixed solvent of ethylene carbonate and 1,2-dimethoxyethane and put in an aluminum laminate film pack. The film pack was heat-sealed while evacuating so as to prevent air from being entrapped between the electrodes to complete a battery having a multilayer structure. Similarly to the batteries of Embodiments 11 and 12, there was obtained a compact lithium ion secondary battery having a large energy density, excellent charge and discharge characteristics, a large battery capacity, and high durability, reliability and safety.

While in this embodiment the positive electrode of band form was arranged between a pair of separators of band form, and the negative electrode was arranged on one of the separators, the same type of a battery could be prepared by arranging the negative electrode in between the separators and the positive electrode on one of the separators.

In Embodiments 11 to 13, when the number of the electrode laminates was varied, the battery capacity increased with the number of the laminates.

Embodiment 14

An solid electrolyte, the positive electrode prepared in Embodiment 1, and the negative electrode prepared in Embodiment 2, were laminated to form a tabular laminate battery body having the structure shown in FIG. 2. Current collecting tabs connected to the every end of the positive electrodes and the negative electrodes were connected by spot welding to make electrical connections in series. The solid electrolyte is formed as follows. At first an electrolytic solution is obtained by solving 1 mol/l of lithium hexafluorophosphate (electrolyte) in a mixed solvent of ethylene carbonate and 1,2-dimethoxyethane. And an mixture of 30 wt % of acrylate compound (PEM 1000), 1 wt. % of azobisisobuthyronitorile and the solution is put into a clearance of 0.5 mm between glass plates and dried by heating at 80° C. for 2 hours to form a gel-state of solid electrolyte. And then a small amount of The film pack was heat-sealed while evacuating so as to prevent air from being entrapped between the electrodes to complete a battery having a multilayer structure.

On evaluating the battery characteristics, the energy density per unit weight was 70 Wh/kg. Even after 100 charge and discharge cycles at a current of C/4, the charge capacity was as high as 60% of the initial level.

Embodiment 15

An solid electrolyte, the positive electrode prepared in Embodiment 1, and the negative electrode prepared in Embodiment 2, were laminated to form a tabular laminate battery body having the structure shown in FIG. 2. Current collecting tabs connected to the every end of the positive electrodes and the negative electrodes were connected by spot welding to make electrical connections in series. The solid electrolyte is formed as follows. At first, tetrahydrofuran mixed to a mixture of 30 wt % of acrylate compound PEM1000 and 1 wt % of azobisisobuthyronitrile is put into a clearance of 0.5 mm between glass plates and dried by heating at 80° C. for 2 hours to form a gel-state of solid electrolyte. And then the solid electrolyte is dried at 60° C. for 1 hour with fixing peripheral portion so as to prevent the solid electrolyte from shrinking. And then a small amount of The film pack was heat-sealed while evacuating so as to prevent air from being entrapped between the electrodes to complete a battery having a multilayer structure.

On evaluating the battery characteristics, the energy density per unit weight was 65 Wh/kg. Even after 100 charge and discharge cycles at a current of C/4, the charge capacity was as high as 60% of the initial level.

According to the present invention, the electrode obtained by forming a mixture of a powdered active material and electrically conductive fiber into sheeting exhibits high performance, having an increased active material packing density, flexibility, improved durability against deformation, resistance to destruction, high reliability and safety, and excellent battery characteristics. In addition, the electrode can be impregnated with an electrolytic solution with ease, making battery assembly simpler.

According to one embodiment of the electrode which is composed of a fiber-containing active material layer formed of a mixture of a powdered active material and conductive fiber and an active material layer made of the powdered active material, the electrode produces not only the above-described effects but also the effect that the conductive fiber is prevented from being exposed on the surface and scratching the separator when assembled into a battery. Therefore the safety is improved.

According to another embodiment of the electrode which comprises a conductive film having thereon a fiber-containing active material layer formed of a mixture of a powdered active material and conductive fiber, the active material packing density can be increased, and the flexibility can be improved. As a result, a high performance and high safety electrode with excellent durability can be obtained. Such an electrode provides a lithium ion secondary battery having high reliability, high safety, and excellent battery characteristics.

The lithium ion secondary battery according to the present invention has an electrode laminate composed of a pair of electrodes according to the present invention adhered via a separator therebetween. The battery is hardly destroyed, excellent in durability, and safe. It can take any arbitrary shape, such as a thin shape, and yet has a large energy density and excellent charge and discharge characteristics.

Where the lithium ion secondary battery has a plurality of the above-mentioned electrode laminates, the resulting battery is still compact and has high performance and a large battery capacity with excellent durability and reliability.

What is claimed is:

1. A lithium ion secondary battery having an electrode laminate composed of a positive electrode, a negative electrode and electrolyte interposed therebetween, wherein at least one of said positive electrode and negative electrode comprises a fiber-containing active material layer of sheet form containing voids and formed of a uniform mixture comprising a powdered active material and electrically conductive fiber, and further comprising an additional active material layer comprising the powdered active material formed on said fiber-containing active material layer, wherein the electrolyte is a solid electrolyte.

2. A lithium ion secondary battery having plurality of electrode laminates each of which is composed of a positive electrode, a negative electrode and electrolyte interposed therebetween, wherein at least one of said positive electrode and negative electrode comprises a fiber-containing active material layer of sheet form formed of a mixture comprising a powdered active material and electrically conductive fiber, wherein said plurality of electrode laminates are made up of either a rolled pair or a folded pair of electrolytes in between which the positive electrodes and the negative electrodes are alternately interposed.

3. The lithium ion secondary battery as claimed in claim 2, wherein said plurality of electrode laminates are made up of a rolled pair of electrolytes in between which the positive electrodes and the negative electrodes are alternately interposed.

4. The lithium ion secondary battery as claimed in claim 2, wherein said plurality of electrode laminates are made up of a folded pair of electrolyte in between which the positive electrode and the negative electrode are alternately interposed.

5. An electrode for a lithium ion secondary battery consisting of a fiber-containing active material layer of sheet form containing voids and formed of a uniform mixture comprising a powdered active material and electrically conductive fiber, and an additional active material layer comprising the powdered active material formed thereon, wherein the fiber-containing active material layer is formed on an electrically conductive film, and wherein said fiber-containing active material layer acts as a current collector.

6. A lithium ion secondary battery having an electrode laminate composed of a positive electrode, a negative electrode and electrolyte interposed therebetween, wherein at least one of said positive electrode and negative electrode comprises a fiber-containing active material layer of sheet form formed of a mixture consisting of a powdered active material, electrically conductive fiber and a binder material, wherein the electrolyte is a solid electrolyte.

7. A lithium ion secondary battery having an electrode laminate composed of a positive electrode, a negative electrode and electrolyte interposed therebetween, wherein at least one of said positive electrode and negative electrode comprises a fiber-containing active material layer of sheet form formed of a mixture consisting of a powdered active material, electrically conductive metal fiber and a binder material, wherein said electrically conductive fiber is selected from the group consisting of aluminum, copper, and stainless steel.

8. A lithium ion secondary battery having an electrode laminate composed of a positive electrode, a negative electrode and electrolyte interposed therebetween, wherein at least one of said positive electrode and negative electrode comprises a fiber-containing active material layer of sheet form formed of a mixture consisting of a powdered active material, electrically conductive fiber and a binder material, wherein said electrically conductive fiber in positive electrode is made of aluminum fiber.

9. A lithium ion secondary battery having an electrode laminate composed of a positive electrode, a negative electrode and electrolyte interposed therebetween, wherein at least one of said positive electrode and negative electrode comprises a fiber-containing active material layer of sheet form formed of a mixture consisting of a powdered active material, electrically conductive fiber and a binder material, and wherein said fiber-containing active material layer is present without a supporting substrate, and further comprising an additional active material layer comprising a powdered active material formed on said fiber-containing active material layer.

10. The lithium ion secondary battery as claimed in claim 9, wherein the additional active material layer contains no electrically conductive fiber.

11. An electrode for a lithium ion secondary battery comprising a fiber-containing active material layer of sheet form formed of a mixture comprising a powdered active material selected from the group consisting positive electrode active materials and negative electrode active materials, wherein said positive electrode active materials are lithium-containing and said negative electrode active materials are substances capable of intercalating and disintercalating lithium ions, and electrically conductive fiber, and wherein said fiber-containing active material layer is present without a supporting substrate, further comprising an additional active material layer comprising a powdered active material formed thereon.

12. The electrode for a lithium ion secondary battery as claimed in claim 11, wherein the additional active material layer contains no electrically conductive fiber.

13. A lithium ion secondary battery having an electrode laminate composed of a positive electrode, a negative electrode and electrolyte interposed therebetween, wherein at least one of said positive electrode and negative electrode comprises a fiber-containing active material layer of sheet form formed of a mixture comprising a powdered active material and electrically conductive fiber, and wherein said fiber-containing active material layer is present without a supporting substrate, further comprising an additional active material layer comprising a powdered active material formed thereon.

14. The lithium ion secondary battery as claimed in claim 13, wherein the additional active material layer contains no electrically conductive fiber.

15. An electrode for a lithium ion secondary battery comprising a fiber-containing active material layer of sheet form containing voids and formed of a uniform mixture comprising a powdered active material and electrically conductive metal fiber, wherein the fiber-containing active material layer is formed on an electrically conductive film.

16. A lithium ion secondary battery having an electrode laminate composed of a positive electrode, a negative electrode and electrolyte interposed therebetween, wherein at least one of said positive electrode and negative electrode comprises a fiber-containing active material layer of sheet form containing voids and formed of a uniform mixture comprising a powdered active material and electrically conductive metal fiber, wherein the electrolyte is a solid electrolyte.

17. A lithium ion secondary battery having plurality of electrode laminates each of which is composed of a positive electrode, a negative electrode and electrolyte interposed therebetween, wherein at least one of said positive electrode and negative electrode comprises a fiber-containing active material layer of sheet form formed of a mixture comprising a powdered active material and electrically conductive metal fiber.

18. The lithium ion secondary battery as claimed in claim 17, wherein said plurality of electrode laminates are fabricated of a plurality of cut sheets of the electrolyte between which positive electrodes and negative electrodes are alternately interposed.

19. The lithium ion secondary battery as claimed in claim 17, wherein said plurality of electrode laminates are made up of a rolled pair of electrolytes in between which the positive electrodes and the negative electrodes are alternately interposed.

20. The lithium ion secondary battery as claimed in claim 17, wherein said plurality of electrode laminates are made up of a folded pair of electrolyte in between which the positive electrode and the negative electrode are alternately interposed.

21. An electrode for a lithium ion secondary battery consisting of a fiber-containing active material layer of sheet form containing voids and formed of a uniform mixture comprising a powdered active material, electrically conductive metal fiber, and binder material, wherein the fiber-containing active material layer is formed on an electrically conductive film.

22. An electrode for a lithium ion secondary battery comprising a fiber-containing active material layer of sheet form formed of a mixture comprising a powdered active material selected from the group consisting positive electrode active materials and negative electrode active materials, wherein said positive electrode active materials are lithium-containing and said negative electrode active materials are substances capable of intercalating and disintercalating lithium ions, and electrically conductive metal fiber, and wherein said fiber-containing active material layer is present without a supporting substrate.

23. The electrode for a lithium ion secondary battery as claimed in claim 22, further comprising an additional active material layer comprising a powdered active material formed thereon.

24. The electrode for a lithium ion secondary battery as claimed in claim 23, wherein the additional active material layer contains no electrically conductive fiber.

25. An electrode for a lithium ion secondary battery comprising a fiber-containing active material layer of sheet form formed of a mixture comprising a powdered active material selected from the group consisting positive electrode active materials and negative electrode active materials, wherein said positive electrode active materials are lithium-containing and said negative electrode active materials are substances capable of intercalating and disintercalating lithium ions, and electrically conductive metal fiber, wherein the fiber-containing active material layer is formed on an electrically conductive film, and wherein said fiber-containing active material layer acts as a current collector.

26. A lithium ion secondary battery having an electrode laminate composed of a positive electrode, a negative electrode and electrolyte interposed therebetween, wherein at least one of said positive electrode and negative electrode comprises a fiber-containing active material layer of sheet form formed of a mixture comprising a powdered active material and electrically conductive metal fiber, wherein the electrolyte is a solid electrolyte.

27. An electrode for a lithium ion secondary battery made of a fiber-containing active material layer of sheet form containing voids and formed of a uniform mixture comprising a powdered active material and electrically conductive fiber, wherein the additional active material layer contains no electrically conductive fiber.

28. A lithium ion secondary battery having an electrode laminate composed of a positive electrode, a negative electrode and electrolyte interposed therebetween, wherein at least one of said positive electrode and negative electrode comprises a fiber-containing active material layer of sheet form containing voids and formed of a uniform mixture comprising a powdered active material and electrically conductive fiber, and further comprising an additional active material layer comprising the powdered active material formed on said fiber-containing active material layer, wherein the additional active material layer contains no electrically conductive fiber.

29. A lithium ion secondary battery having an electrode laminate composed of a positive electrode, a negative electrode and electrolyte interposed therebetween, wherein at least one of said positive electrode and negative electrode comprises a fiber-containing active material layer of sheet form formed of a mixture consisting of a powdered active material, electrically conductive fiber and a binder material and further comprising an additional active material layer comprising the powdered active material formed thereon, wherein said electrically conductive fiber in negative electrode is made of carbon fiber, wherein the additional active material layer contains no electrically conductive fiber.

30. An electrode for a lithium ion secondary battery comprising a fiber-containing active material layer of sheet form formed of a mixture comprising a powdered active material layer of sheet form formed of a mixture comprising a powdered active material selected from the group consisting positive electrode active materials and negative electrode active materials, wherein said positive electrode active materials are lithium-containing and said negative electrode active materials are substances capable of intercalating and disintercalating lithium ions, and electrically conductive fiber, wherein the fiber-containing active material layer is formed on an electrically conductive film, and wherein said fiber-containing active material layer acts as a current collector, further comprising an additional active material layer comprising the powdered active material formed thereon, wherein the additional active material layer contains no electrically conductive fiber.

31. A lithium ion secondary battery having an electrode laminate composed of a positive electrode, a negative electrode and electrolyte interposed therebetween, wherein at least one of said positive electrode and negative electrode comprises (1) a fiber-containing active material layer of sheet form formed of a mixture comprising a powdered active material and electrically conductive fiber, wherein the electrolyte is a solid electrolyte, and (2) an additional active material layer comprising the powdered active material formed thereon, wherein the additional active material layer contains no electrically conductive fiber.

32. A lithium ion secondary battery having an electrode laminate composed of a positive electrode, a negative electrode and electrolyte interposed therebetween, wherein at least one of said positive electrode and negative electrode comprises (1) a fiber-containing active material layer of sheet form formed of a mixture comprising a powdered active material and electrically conductive fiber, wherein the electrolyte is a separator retaining an electrolytic solution, and (2) an additional active material layer comprising the powdered active material formed thereon, wherein the additional active material layer contains no electrically conductive fiber.

33. An electrode for a lithium ion secondary battery comprising a fiber-containing active material layer of sheet form containing voids and formed of a uniform mixture comprising a powdered active material and electrically conductive metal fiber, further comprising an additional active material layer comprising the powdered active material formed thereon, wherein the additional active material layer contains no electrically conductive fiber.

34. An electrode for a lithium ion secondary battery consisting of a fiber-containing active material layer of sheet form containing voids and formed of a uniform mixture comprising a powdered active material, electrically conductive metal fiber, and binder material, further comprising an additional active material layer comprising the powdered active material formed thereon, wherein the additional active material layer contains no electrically conductive fiber.

* * * * *